T. G. Arnold.
Lathe Chuck.
Nº 60,116.        Patented Dec. 4, 1866.
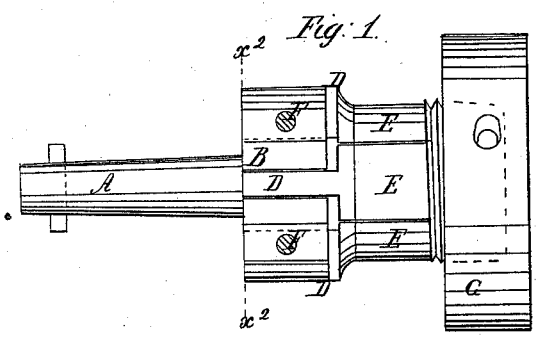
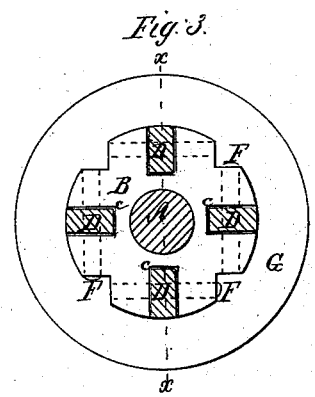
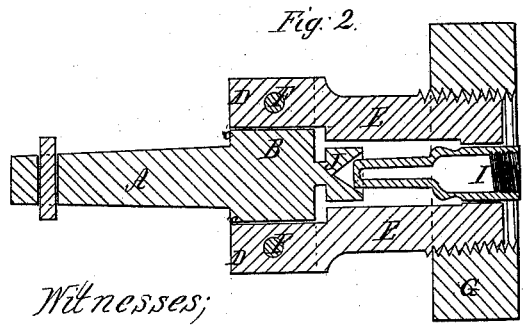
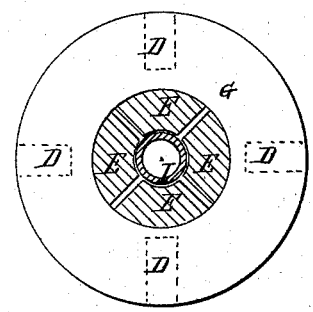
Witnesses;
Inventor;
T. G. Arnold

United States Patent Office.

IMPROVEMENT IN CHUCKS.

T. G. ARNOLD, OF NEW YORK, N. Y.

Letters Patent No. 60,116, dated December 4, 1866.

SPECIFICATION.

TO ALL WHOM IT MAY CONCERN:

Be it known that I, T. G. ARNOLD, of the city, county, and State of New York, have invented certain new and useful improvements in Chucks for holding metal tubing, or other articles or substances, in lathes; and I do hereby declare that the following is a full description of the same.

The nature of my invention consists in first forming the head of the chuck and stock or centre (upon which it is secured on the mandrel of the lathe) solid, and of one piece of metal; second, in securing the jaws of the chuck into the head-piece by centre pins, so that the outer ends of the jaws may have an expanding motion, but at the same time held steadily and firmly at their back ends in the head-piece by the centre pins, and thus enable the jaws to bite with more sharpness and solidity than possible to attain by any other means of holding the jaws in the head-piece. But to describe my invention more particularly, I will refer to the accompanying drawings, forming a part of this specification, the same letters of reference, wherever they occur, referring to like parts.

Figure 1 is a side view of the chuck.

Figure 2 is a cut sectional view of the same through the line $x\ x$, fig. 3.

Figure 3 is a transverse cut section of the chuck through the line $x^2\ x^2$, fig. 1.

Figure 4 is a face view of the chuck.

Letter A is the stock or stem of the chuck, having a solid head-piece, B. In this head-piece are cut four longitudinal slots, C, of about half an inch deep. In these slots are fitted the tang D, of the jaws E, which are severally held in the several slots by pins, F, passing transversely through the tangs and a section of the head-piece. The object of this mode of securing the jaws in the head-piece of the chuck is to permit the jaws to have an expanding motion at their outer ends by working on the pins, F, as a centre of motion, but from their accuracy of fit in the slot prevented from having any lateral or yielding motion when clamping the pipe or other article between the jaws during the operation of screwing up the binding-nut G on the outer ends of the jaws. It will be obvious that for the purpose of causing the jaws to bite different sizes of tubes, or other articles, within the limited capacity of the chuck, the outer ends of the external surface of the jaws are made tapering, so that as the nut draws up the taper their ends are contracted upon the article, and it is thereby held firmly and solidly as if in a vise; and as the jaws are made in four sections they will readily adapt themselves to any little inequalities in the surface or diameter of the tubing in the act of screwing up the nut on them. It will also be observed that from the limited capacity of the chuck it is not designed for a universal chuck. The special object of the invention is for the use of gas-pipe fitters and others engaged in boring and turning small articles of uniform pattern, or nearly so, but want great strength and accuracy as well as durability, and especially facility of rapid adjustment on account of the immense number of such small articles required to be turned out daily to make it profitable at the prices usually charged for such articles. My invention is, therefore, to accomplish all these advantages. Letter I represents an ordinary gas-burner, as adjusted in the chuck, the end of which fits into a socket, J, in the centre of the head-piece. This socket, however, is not a material fixture, as a central opening in the head-piece will answer equally well. And in making the chuck for some purposes it is designed to make the head-piece with a central opening in the like manner as the ordinary chuck, so as to be screwed on the end of the mandrel instead of using the stem A, as represented.

Having now described my invention, I will proceed to set forth what I claim and desire to secure by Letters Patent of the United States:

I claim the arrangement of the expanding jaws E, pivoted to the solid head-piece B, constructed and operating substantially as hereinbefore set forth and for the purposes described.

T. G. ARNOLD.

Witnesses:
 C. L. BARRITT,
 RICHD L. H. FINCH.